March 18, 1941.  F. P. GRUTZNER  2,235,152
HEATING AND VENTILATING SYSTEM
Filed Oct. 9, 1939
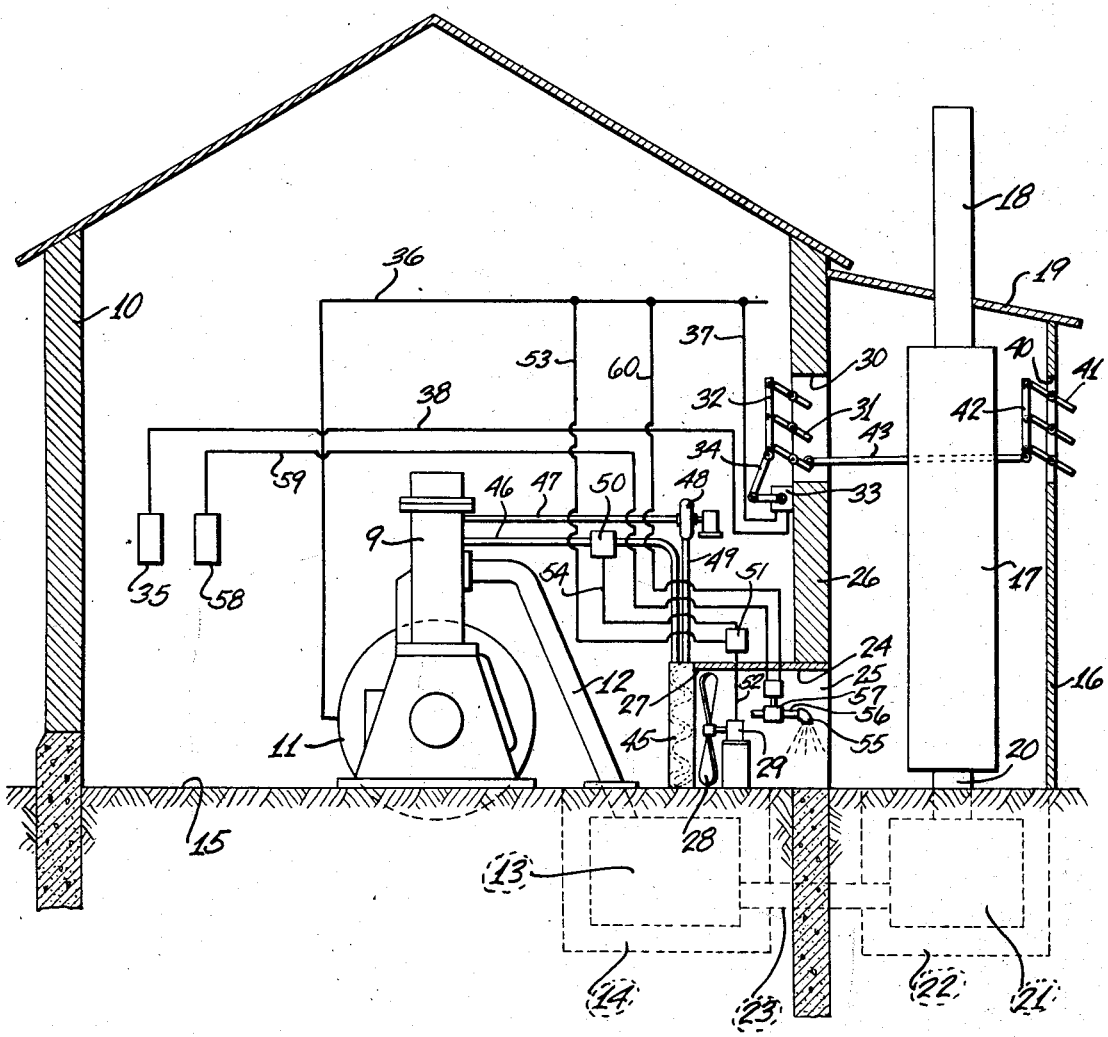
INVENTOR
FRITZ PAUL GRUTZNER
BY Paul L. Kiehu
ATTORNEY.

Patented Mar. 18, 1941

2,235,152

UNITED STATES PATENT OFFICE 2,235,152

HEATING AND VENTILATING SYSTEM

Fritz Paul Grutzner, Beloit, Wis., assignor to Fairbanks, Morse & Co., Chicago, Ill., a corporation of Illinois Application October 9, 1939, Serial No. 298,592

4 Claims. (Cl. 237—2)

This invention relates to improvements in heating and ventilating systems, and more particularly to an improved heating and ventilating system in combination with an internal combustion engine, wherein the engine serves as the source of both heat and power for the system. The instant application is a continuation in part of my application for United States Letters Patent, for Heating and ventilating systems, filed June 15, 1936, and bearing Serial No. 85,272.

As is well known, the function of the internal combustion engine is to transform thermal energy into mechanical energy, the mechanical energy thereby produced being utilized directly for power purposes, or for producing electrical energy, as by utilizing the engine to drive an electric generator. However, as a power producing agency, the internal combustion engine is notoriously inefficient, since less than half of the total thermal energy produced as a result of fuel combustion within the engine is transformed into mechanical energy available as such at the crankshaft. The greater portion of the thermal energy produced is normally lost in the form of heat in the exhaust, in the jacket cooling system and through mechanical friction and radiation. Moreover, as will be readily understood, the total thermal energy produced in an engine is proportionate to and varies with the power loading thereof. Thus, when the engine is operating at substantially its full load capacity, the total waste heat, being that heat lost in the exhaust gases, engine cooling system, friction of engine moving parts and radiation, will be considerably greater than when the engine is running under no load or under load less than full load. A substantial portion of this waste heat, particularly that lost in the engine cooling system and in the exhaust gases, may be recovered and utilized for heating purposes. Accordingly, the present invention contemplates an improved system for recovering the normally waste heat produced by an internal combustion engine while in operation, and applying such heat to the heating of buildings, automotive vehicles, aircraft, ships and the like.

Hence, it is an object of the present invention to provide an improved heating and ventilating system in conjunction with an internal combustion engine, wherein the waste heat produced by the engine during its operation, together with part of the power developed thereby, is utilized in the system. More specifically stated, the object is to provide a heating and ventilating system for buildings, ships, automotive vehicles, and the like, wherein the waste heat produced by an internal combustion engine in operation, is utilized as the heating medium for the heating apparatus of the system, and wherein the power developed by the engine is utilized for operating the ventilating and other apparatus of the system, and for general power purposes.

Another object is found in the provision in a system of the type desscribed, of automatically operated control means for supplying heated air to an object or space to be heated, the means being operable to proportion the delivery of heated air thereto according to the heat requirements of such space, and to vent to the atmosphere any remaining portion of the heated air not required for heating purposes.

A further object is to provide in a system of the type described, automatically operable control means for supplying heated air to an object or space to be heated, the delivery of heated air thereto by such means being controlled by a suitable device of thermostatic type located in the space to be heated, and operable to regulate the means in accordance with the heat requirements of the space, the control of heat delivery by the thermostat being effected independently of the amount of waste heat produced by the engine during its operation.

A still further object is to provide in a system of the type noted, automatically controlled heating and ventilating apparatus including a blower and a heat exchanger device or radiator, and air stream directing means, the apparatus functioning to create a positive flow of air through the radiator, by which the air is heated, and to deliver through the directing means, part or all of the heated air either to a space to be heated or to the outside atmosphere, the positive flow of air created by the blower also serving to effect a circulation of the air in and through the space for the ventilation thereof.

Yet another object is found in the provision in a system of the type described, of regulated heating and ventilating apparatus including a radiator and a blower and the exhaust discharge system of the engine, including an exhaust silencer therein, in which the blower serves to create a positive air stream which is directed through the radiator and about the exhaust silencer, to be heated thereby; the apparatus also including an automatically controlled humidifier assembly comprised of a water spray device located in the path of the air stream effected by the blower, whereby the water spray will be entrained in the air stream and evaporated to provide the desired degree of humidity in the air delivered to the space to be heated and ventilated.

A still further object is to provide in a power and heating system of the type described, heat transfer apparatus associated with the engine jacket cooling system, the apparatus serving to cool the jacket water and in doing so to heat air for delivery to an object or space to be heated, and automatic regulating means of thermostatic type, for controlling the rate of jacket water cooling by the heat transfer apparatus, such control being effected independently of the demand for heat by the object or space to be heated.

A still further object is found in the provision in a system of the type described, of heat transfer apparatus of the forced air circulation type for supplying heated air to an object or space to be heated, in which air to be heated is forced through the heat transfer apparatus and then through air delivery means by which the heated air is directed in varying proportion to the object or space, according to demand for heat therein, with the remainder of the heated air vented to the outside atmosphere or some other space. The apparatus is adapted to provide complete ventilation of the space, as by venting to atmosphere all the heated air passing through the transfer apparatus when no call for heat is made to the space to be heated, and for providing a partial heating and ventilation thereof by proportioning the division of heated air to the atmosphere and to the space to be heated in accordance with the degree of heat demand of the space, the demand being by preference, registered upon a thermostatic device which controls the proportioning of the air flow.

From the foregoing objects it will appear that, generally stated, the present invention attains a combined power and heating and ventilating system employing an internal combustion engine as a source of power, and utilizing as sources of heat the exhaust and jacket heat of the engine, the arrangement preferably being such that a space is heated and ventilated under automatic control; further such that exhaust heat recovery and engine cooling action are both automatically controlled. The invention further attains full thermostatic control of engine cooling and space heating through thermostatic apparatus preferably acting independently for these purposes in a system utilizing the same heat transfer apparatus for both room heating and engine cooling.

The foregoing and numerous other objects and advantages will be found from the following description and from the drawing, the single figure of which is a diagrammatic illustration of a preferred embodiment of the system incorporating the features of the present invention.

While the system embodying the improvements of the present invention may be employed in combination with any suitable type of internal combustion engine, it is preferred to describe and illustrate the system as applied to an engine of Diesel type, since this type of engine is recognized as being an economical transformer of thermal energy into mechanical energy. Moreover, the system presently to be described is readily applicable to the heating and ventilating of residences and buildings generally, railway and automotive vehicles, ships, aircraft and the like.

Referring to the drawing, an engine 9 of Diesel type is arranged within a building 10 which contains a space or spaces to be heated and ventilated, the engine in addition to its service as a heating unit, serving to provide power for general use in the building. In the example illustrated, the engine serves to drive a generator 11 for providing electric power. The engine may be of single of multi-cylinder type with each cylinder provided with an exhaust conduit 12 leading to an exhaust manifold 13. The manifold is, by preference, disposed within a depression or pit 14 in the base or floor 15 of the building. An exhaust silencer housing 16 is shown as located adjacent to and externally of the building 10, but which may be a part of the building, and within which is disposed an exhaust silencer 17. An exhaust outlet 18 extends from the upper end of the silencer and through the roof 19 of the housing, to vent the exhaust gases to the atmosphere. A conduit 20 connects the lower end of the silencer with an exhaust chamber 21 disposed in a pit 22 beneath the housing 16, while the manifold 13 and chamber 21 are connected by a conduit 23. Thus the exhaust gases from the engine flow through the conduit or conduits 12 to the manifold 13, thence through conduit 23 to the chamber 21 and through conduit 20, silencer 17 and exhaust vent 18 to the atmosphere. Since the exhaust silencer 17 becomes heated to an appreciable extent during operation of the engine, it may readily serve as a heating unit for heating air which then may be circulated through the building 10.

Accordingly, an air conduit 24 is, by preference, disposed adjacent the floor of the building with one end 25 thereof extending through the wall 26 of the building so as to communicate with the interior of the silencer housing 16. Located within and adjacent the opposite end 27 of the air conduit 24 is an air blower 28 which may be operated by an electric motor 29. An air opening or passage 30 is arranged in the wall 26, providing for the flow of air from the silencer housing into the building 10. Arranged at the opening are a plurality of adjustable dampers 31 connected for concurrent movement, as by a bar 32. The dampers are regulated to control the air flow through the passage 30 by a motor 33 having an operating connection 34 with bar 32, the operation of the motor being, by preference, controlled by a room thermostat such as that illustrated at 35. The operating connection between the motor and thermostat may be provided for by any well known circuit arrangement generally employed for this purpose, the control arrangement being such that the thermostat functions to operate the motor in a manner to regulate the amount of hot air flow into the building through the passage provided therefor, responsively to the climatic conditions existing within the building. By way of example, the circuit connections are shown broadly, in a diagrammatic manner in the drawing. Energizing current for the circuit may be supplied by the generator 11, driven by the engine 9. A generator power main is indicated at 36, from which a connection 37 leads to motor 33. A control circuit 38 interconnects the thermostat 35 and motor 33. The thermostat may be of a well known potentiometer type and the motor 33 so constructed as to be controlled thereby in a manner to position the louvers or dampers 31 in full-open, full-closed or in any intermediate position, as dictated by the heating demand in the space to be heated.

A second opening or passage 40 is located in an outer wall of the silencer housing so as to be open to the atmosphere, and arranged in the opening are adjustable dampers 41 connected together by a bar 42 for simultaneous movement.

The air control position of the dampers 41 is regulated concurrently with the positioning of the dampers 31 by the motor 33, as by an interconnecting lever 43 arranged in the manner illustrated. The arrangement of the dampers as connected for concurrent operation, is such that as the dampers 31 in passage 30 are actuated toward full-closed position, the dampers in opening 40 will be actuated toward full-open position, and vice versa. Positioning of the dampers 31 intermediate their full-open and full-closed positions will also effect an intermediate positioning of the dampers 41.

In the operation of the system, the blower 28 when operated creates a positive stream of air, the air being drawn from within the building and forced through the conduit 24 into the silencer housing where it becomes heated by contact with the hot silencer 17, which in the arrangement disclosed thus serves the purpose of an exhaust heater. If the room thermostat 35 registers a maximum demand for heat in the building, it will cause operation of the motor 33 to actuate the dampers 31 to full-open position, and concurrently therewith to actuate the dampers 41 to full-closed position. In this instance, all the heated air in the silencer housing will flow through passage 30 into the building, wherein it will circulate and finally be drawn by the fan or blower back into the silencer housing for reheating. Thus a continuous circulation of air in the manner described is effected. When a less demand for heat is made within the building, both sets of dampers will be concurrently positioned somewhere between full-open and full-closed position, whereby a certain portion of the heated air within the silencer housing may flow to the building through passage 30, while the remainder may pass to the atmosphere through the opening 40. On warm days, or during the summer season, the thermostat 35 may cause the motor to operate the dampers 31 to full-closed position and the dampers 41 to full-open position, whereby the heated air in the silencer housing will be entirely vented to atmosphere. In such instances, the building will be fully ventilated through a forced circulation of air therethrough, as created by the blower 28.

Additional heat may be added to the air circulating in the system above described, through a suitable heat transfer element deriving its heat from the engine water cooling system. Accordingly, a radiator 45 is arranged adjacently to or in the inlet end 27 of air conduit 24, so as to be directly in the path of air flow created by the fan or blower 28. A pipe 46 connects the radiator to the inlet end of the engine cooling jacket (not shown) while a pipe 47 leads from the jacket outlet to the inlet of a motor-driven circulation pump 48. The pump discharge is delivered to the radiator through a pipe 49. It will be understood of course, that the primary function of the radiator 45, as assisted by the blower 28 creating a positive flow of air in contact therewith, is to cool the jacket water in the engine cooling system, and this function of the elements referred to must be maintained irrespective and wholly independent of space heating demand within the building. In order to vary the cooling effect of the radiator and blower on the jacket water as conditions of engine operation change, the blower operating motor 29 illustrated in the present embodiment of the invention, is by preference of a variable speed type. Speed control of the motor and hence of the blower 28, to vary the rate of air-flow in contact with the radiator, is desirably made a function of the jacket water temperature, and for this purpose there is illustrated diagrammatically in the drawing, a control circuit including a thermostatic device 50 suitably located in the jacket water return pipe 46, so as to be responsive to the temperature of the jacket water circulating therethrough. A control device 51 of suitable type, is associated with motor 29 through the electrical connection 52, and is supplied with power for motor-operation, through a connection 53 from the generator main 36. The motor speed regulating device 51 is rendered subject to the thermostat 50 through a connection 54 therebetween. Thus, should the jacket water temperature tend to rise above a predetermined maximum value for which the thermostat is set, the device 51 as controlled by the thermostat 50, will effect an increase in motor speed, which results in an increased rate of air flow through the radiator 45, and hence a more rapid removal of heat from the jacket water. A reduction in motor-blower speed, proportionately to a lower jacket water temperature, will likewise occur in response to the functioning of the thermostat 50.

In certain installations of the present system, it may be desirable to further condition the heated air utilized for space-heating, by regulating its moisture-content in response to a humidostat suitably located in the space to be air-conditioned. Accordingly, a water-spray means 55 may be located in the path of air circulation, as in the conduit 24. The spray means or nozzle device 55 is supplied with water from a suitable source (not shown) through a supply pipe 56, and is controlled by a suitable valve 57 preferably of automatic type, as an electro-magnetically actuated valve. A humidostat 58 arranged within the building 10 preferably near the thermostat 35, controls the valve through a circuit connection 59, while power is supplied to the valve through a connection 60 from the power main 36. The function of the humidostat-controlled spray means is well understood, hence will not be here described.

The present invention, as will be readily understood from the foregoing description of the illustrated embodiment thereof, provides a combined power, heating, ventilating and humidifying system including an internal combustion engine, in which the engine serves as the source of both power and heat, the latter being found in the waste heat resulting from the operation of the engine. The complete system attains a fully automatic control of the heating, ventilating and humidifying features, the control thereof being responsive to temperature and humidity conditions existing in the space to be air-conditioned. Since the embodiment illustrated in the drawing is primarily in the nature of a preferred diagrammatic showing thereof, it is to be understood that the arrangement of the elements included in the system may be modified or otherwise altered to suit each installation of the system.

As before noted, the system is readily applicable for the purposes described, to buildings generally, automotive vehicles, aircraft, ships, etc., and in all of its applications, the system may be readily adapted to meet all or any part of the power, heating and ventilating requirements, as desired.

It is to be understood that the invention exemplified in the preferred embodiment illustrated and described hereinabove, is not to be limited solely to the particular embodiment shown, but that this may be altered or modified without affecting the spirit and scope of the invention, as defined in the accompanying claims.

I claim:

1. The combination in a heating and ventilating system, of an internal combustion engine provided with an exhaust discharge conduit means, an exhaust silencer in the circuit of said conduit means, a cooling system for the engine arranged for the rejection of engine heat and of a type utilizing a cooling liquid, a radiator constituting an element of said system, means for impelling a current of air through said radiator and about said exhaust silencer, means in the cooling system for circulating the cooling liquid between and within the engine and radiator, a confined space, such as a room, to be heated, means for variably proportioning the flow of heated air from said radiator and exhaust silencer to the space to be heated, a thermostatic device in controlling relation with said air-impelling means, and operable in accordance with variations in engine cooling-liquid temperature, and a second thermostatic device arranged to control said proportioning means in accordance with variations of the temperature of the space to be heated.

2. In a system of the type described, the combination of an internal combustion engine of jacket-cooled type, a fluid circulating jacket cooling system functionally associated with the engine jacket, said cooling system including a heat-exchanger, an exhaust discharge system for the engine, including an exhaust silencer, a space to be air-conditioned, a variable speed blower for circulating air from said space into contact with said heat-exchanger to be heated thereby, and thus to cool the engine jacket fluid circulated through the heat-exchanger, means for conducting said air after contact with the heat exchanger, into contact with said exhaust silencer, and thence to said space and to atmosphere, means including an operating motor therefor, associated with said conducting means, adapted for proportioning the flow of air to the space and to the atmosphere, thermostatic means responsive to temperature conditions in said space, for controlling operation of said motor, and thermostatically operated means in control of said blower and responsive to the temperature of the fluid circulated in said engine jacket system, for controlling the speed of said blower.

3. In a system of the type described, the combination of an internal combustion engine of jacket-cooled type, a fluid circulating jacket cooling system functionally associated with the engine jacket, and including a heat-exchanger, an exhaust discharge system for the engine, including an exhaust silencer, a space to be air-conditioned, a variable speed blower for circulating air from said space into contact with said heat exchanger to be heated thereby, and thus to cool the engine jacket fluid circulated through the heat exchanger, conduit means for conducting said air after contact with the heat exchanger, into contact with said exhaust silencer, to be further heated thereby, said conduit means having air-discharge ports open to atmosphere and to the space to be air-conditioned, air control means operatively associated with said discharge ports and including a single operating motor therefor, adapted for proportioning the flow of heated air after contact with said exhaust silencer, to the space and to the atmosphere, thermostatic means responsive to the temperature conditions in said space for controlling operation of said motor, and thermostatically operated means in control of said blower and responsive to the temperature of the fluid circulated in said engine jacket system, for controlling the speed of said blower.

4. In a heating system for a space to be heated, the combination of an internal combustion engine of jacket-cooled type, a fluid circulating jacket cooling system functionally associated with the engine jacket and including a radiator and a pump for circulating the cooling fluid in said system and radiator, a space to be air-conditioned, a variable speed blower arranged adjacent said radiator for circulating air from said space into contact with the radiator to be heated thereby, and thus to cool the engine jacket fluid circulated in the jacket cooling system, an exhaust discharge system for said engine, including an exhaust silencer, an enclosure for said exhaust silencer providing an air jacket about the silencer, a conduit section communicating with said air jacket and providing an air inlet thereto, said radiator and blower being arranged within said inlet conduit, said enclosure having spaced air discharge ports open to the atmosphere and to said space to be air-conditioned, air control means operatively associated with each of said ports, actuating means for said control means, including a single operating motor therefor, said air control means being adapted for proportioning the discharge of heated air through said ports to atmosphere and to said space, thermostatic means responsive to the temperature conditions in said space, for controlling operation of said motor, and thermostatically operated means in control of said blower and responsive to the temperature of the fluid circulated in said engine jacket system, for controlling the speed of said blower.

FRITZ PAUL GRUTZNER.